United States Patent Office 3,787,482
Patented Jan. 22, 1974

3,787,482
METHOD OF SYNTHESIZING HYDRAZINE COMPOUNDS CARBOXYLIC ACIDS
Frederick C. Bersworth, 120 Washington St., East Orange, N.J. 07017
No Drawing. Continuation-in-part of application Ser. No. 661,204, Aug. 17, 1967, now Patent No. 3,507,892, which is a continuation-in-part of application Ser. No. 580,829, Sept. 20, 1966, now Patent No. 3,351,658, which in turn is a continuation of abandoned application Ser. No. 446,120, Apr. 6, 1965. This application Feb. 20, 1970, Ser. No. 13,189
Int. Cl. C07c 101/26
U.S. Cl. 260—482 P  2 Claims

ABSTRACT OF THE DISCLOSURE

A process for the preparation of hydrazides of amino polycarboxylic acids, particularly dihydrazides, wherein the acid is esterified with a low boiling alcohol in strongly acidic media and the reaction mixture is then made to react with an increased amount of the amino polycarboxylic acid to form a reactive material in solution, whereupon the reaction product ester-acid mixture is reacted with a hydrazine in appropriate molar amount to form mono-, di-, tri-, etc., up to one hydrazide moiety less than the completely converted hydrazide. The carboxylate moieties not converted to hydrazides are converted to hydrazinium salts. The resulting compounds are useful as chelating agents.

RELATED INVENTION AND APPLICATIONS

This application is related to and considered a continuation-in-part of my prior application Ser. No. 661,204, filed Aug. 17, 1967, now U.S. Pat. 3,507,892, which in turn is a continuation-in-part of my earlier filed application Ser. No. 580,829, filed Sept. 20, 1966, now U.S. Pat. 3,351,658, patented Nov. 7, 1967, which in turn is a continuation of my earlier application Ser. No. 446,120, filed Apr. 6, 1965, now abandoned.

BACKGROUND OF THE INVENTION

Recitation of extensive uses of compounds useful as chelating agents is hardly necessary. Chelation is a phenomenon by which organic compounds pick up metal ions in solution and cause them to engage in reactions in media in which they occur. Some chelate compounds with the metal ions are so strong that effectively the metal ion is chemically removed from the solution. Only a change in pH or condition will cause the metal ion to reappear. Since the number of situations in which the chelation phenomenon is useful is as vast and as varied as the chemical situations which exist, specialized uses for specialized chelating agents exist. In fact every chelating agent has optimum conditions for use and others where it is less useful. In the family of amino polycarboxylic acids of which nitrilotriacetic acid and ethylenediaminetetraacetic acid can be considered first and second members, thereafter, the number of acetic acid groups being increased with the number of nitrogens in the chain, there is an existing vast variety of uses for the compounds. In my U.S. Pat. 3,351,658, issued Nov. 7, 1967, I have identified a class of chelating agents based on the extension of polyaminopolycarboxylic acids in that they are reacted with hydrazine compounds and other hydronitrogen compounds to give an amide structure useful in further chelation. These compounds have found great use in the chelation of iron in particular and are of value as chelating agents to be added to the soil to assist plants in taking up trace metals occurring in the soil.

It is, accordingly, a fundamental object of this invention to provide an improved method of synthesizing the hydrazine compounds of aminopolycarboxylic acids to make it possible to come virtually to quantitative preparation of particular hydrazides and to carry the synthesis to the formation of hydrazinium salts of the hydrazide compounds.

Other objects and advantages of the invention will in part be obvious and in part appear hereinafter.

DETAILED DESCRIPTION OF THE INVENTION

The invention involves the preparation of certain polyaminopolycarboxylic acid hydrazides by a process of synthesis wherein the polyaminopolycarboxylic acid is taken through an ester form, with an alcohol boiling below 100° C. e.g. methyl, ethyl, and propyl, in an acid medium and is made to react with additional polyamino polycarboxylic acid to a substantial degree, following which this ester acid reactant is reacted with an amount of hydrazine corresponding to the molar proportion desired for the hydrazide compound. That is to say, an activated anhydride form of the polyaminopolycarboxylic acid seems to result from the preparation in the acid-ester medium and this is thereafter reacted with hydrazine to form a hydrazide. The invention thus is in the process and manipulation of ingredients to carry out the process to produce the end result desired and a further aspect of it is the preparation of the active form of the anhydride of polyaminopolycarboxylic acid.

The activating of the polyaminopolycarboxylic acid is also applicable to other polyaminopolycarboxylic acids, for example, the sequence beginning with nitrilotriacetic acid, which includes ethylenediaminetetraactic acid, hydroxyethylethylenediaminetriacetic acid, diethylenetetraaminepentaacetic acid and cyclohexane diaminetetraacetic acid etc. In fact the acids in which the activation process is applicable may be generally formulated as follows:

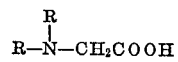

wherein R is selected from the group —CH$_2$COOH, —CH$_2$CH$_2$OH, and polyamino acids are defined as follows:

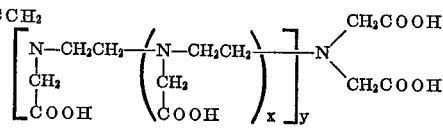

wherein x is 0, 1, or 2, and y is 0, 1 or 2, and as many as one —CH$_2$COOH group per nitrogen may be replaced by —CH$_2$CH$_2$OH. The —CH$_2$COOH group may be —CH$_2$CH$_2$COOH; and the —CH$_2$CH$_2$— groups may be —CH$_2$CH$_2$CH$_2$—,

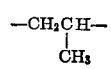

or cyclohexylene.

It should be understood when I speak of the acid, I mean the true acid or anhydride form such as nitrilotriacetic acid and ethylene diaminetetraacetic acid. In this respect the propionic analogues of these acids may also be used, i.e. nitrilotripropionic, ethylenediaminetetrapropionic etc. For purposes of the reaction to form hydrazides they are all to be considered equivalent because they go into acid solution with sulfuric acid to form the ester.

The general reaction can be written wherein the amino acid RCOOH activated in the manner I have described in accordance with this process is reacted with a nucleophilic compound R'NH$_2$ to produce a compound of the following general type:

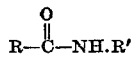

R' can be the residue of a preformed hydrazide (NH$_2$) described in the application of non amino acid hydrazide such as maleic acid, succinic acid and most of others of related structure. When such hydrazides are reacted in accordance with this disclosure, a substituted hydrazide is formed. The chelating moiety has the generic structure:

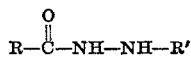

wherein R' is the amino acid residue described herein and can be any of the group of ethylenediamine, ethyleneimine and long chain polyamines. It should be apparent having once reacted the acid with nucleophilic compounds there is produced a compound having a reactive group suitable for substantial variation in further reaction. For example, this may be illustrated in general as follows:

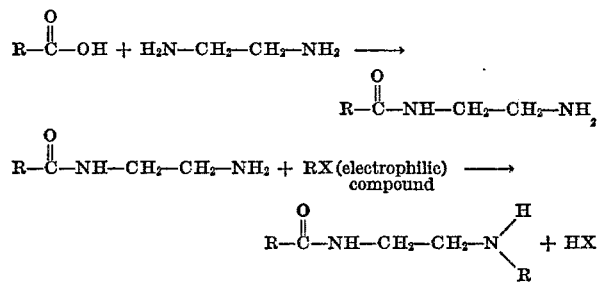

For this electrophil-ester reaction alpha amino acids such as glycine, or its source, gelatin which compound may be hydrolyzed, are reacted directly in the esters of partial ester form.

The details of the operation of the invention from a processing stand point and its variability in the formation of the activated form of the amino polyaminopolycarboxylic acid anhydride will be best understood by reference to the following examples in which it is to be understood that any low boiling alcohol such as ethyl, propyl, or isopropyl can be substituted for methyl.

Examples I, II, and V are procedures which involve isolation of the anhydride and/or ester. The remaining examples use the activating process in which these species are believed to be formed in situ.

In the examples the times of reaction are reported as conservative for inducing full reaction. Furthermore, while all the hydrazine-ester reactions are shown to be conducted under reflux conditions, it should be noted that such reactions may be conducted at room temperature with comparable results. These are details for the judgment of the operator.

EXAMPLE I

From EDTA-anhydride

EDTA-anhydride.—10.0 grams (0.034 mole) of ethylene-diaminetetraacetic acid are dissolved in 100 milliliters of N-methylpyrrolidine with stirring and heating to 160° C. (caution: not over 170° C.). After the solution has cooled to 135° C., 20 milliliters of acetic anhydride are added stirring. After standing at room temperature for 5 hours, the solution is cooled in the refrigerator for 12 hours, whereupon crystals of EDTA-anhydride form. The crystals of the anhydride are washed with benzene until colorless and then dried in vacuum below 100° C.

EDTA-symmetrical-diethyl ester.—To a solution containing 20 grams (0.078 mole) of the EDTA-anhydride in 40 milliliters, 100 milliliters of ethyl alcohol are added, and the mixture refluxed for 3 hours. After removal of the solvent under reduced pressure, 100 milliliters of 50% (volume/volume) ethanol are dried. The solvent was again removed by distillation under reduced pressure leaving a colorless viscous oil. The oil was dried in vacuum under 70° C.

EDTA-symmetrical-dihydrazide (hydrazinium salt).—To a solution containing 10 grams (0.025 mole) of the EDTA-diethyl ester in 100 milliliters ethyl alcohol, 15 milliliters (0.2 mole) of hydrazine hydrate are added. The reaction mixture is then stirred under reflux for 2 hours. Removal of the solvent in vacuo produced a viscous liquid. The product was dried in vacuum below 70° C.

Analysis.—Calcd. for C$_{10}$H$_{28}$O$_6$N$_{10}$ (percent): C, 31.25; H, 7.34; N, 36.44. Found (percent): C, 31.36; H, 7.61; N, 37.00.

EXAMPLE II

From amino acid esters with hydrazine 11.7 grams (0.04 mole) of EDTA (ethylenediaminetetraacetic acid) suspended in 140 grams of methanol and 18.0 grams (0.2 mole) of concentrated sulfuric acid are added with stirring. After refluxing the mixture for 3 to 4 hours, 50% of the methanol is removed by distillation. Cooling yields crystals of the tetramethyl ester disulfate salt of EDTA (yield substantially quantitative).

The ester disulfate is neutralized with sodium bicarbonate in an ice bath and then extracted with ether. The ether is dried with anhydrous magnesium carbonate and removed in vacuo, leaving the pure tetramethyl ester of EDTA.

3.27 grams (0.94 millimole) of the ester and 0.96 gram (1.88 millimoles) of 99% hydrazine hydrate are refluxed in 20 milliliters of ethanol for 3 to 4 hours. White crystals of the dihydrazide of EDTA form after cooling and standing for several hours.

An increase in the molar ratio of hydrazine hydrate to ester produces oils containing higher hydrazides of EDTA, including hydrazine salts of EDTA hydrazides.

It should be noted also that the diester can be hydrazides in the presence of a base such as sodium, potassium hydroxide, or calcium hydroxide, to form solid products.

EXAMPLE III

From the active anhydride with hydrazine 14 grams (0.048 mole) of EDTA (ethylenediaminetetraacetic acid) and 17 grams (0.175 mole) of concentrated sulfuric acid are refluxed in 200 milliliters of methanol. Over a period of 4 to 5 hours, while the solution is being stirred under reflux, an additional 35 grams (0.12 mole) of EDTA is added. It is best if the addition is made in 3 to 5 gram increments. After the final addition of EDTA the solution is refluxed an additional hour. This is an activated anhydride form.

The solution is cooled approximately 20° and 12 grams (0.24 mole) of 99% hydrazine hydrate is added. The solution is refluxed for 5 to 6 hours. Methanol is removed in vacuo leaving a residue of 76 grams of yellow oil. Visible spectra of the iron (III) complex of the oil are characteristic of the iron (III) EDTA-dihydrazide complex.

EXAMPLE IV

From the tetramethyl ester disulfate salt of EDTA with hydrazine

Instead of adding the EDTA and sulfuric acid separately, the sulfate salt of the ester can be employed to give the typical anhydride activity.

2 grams (3.68 millimoles) of the tetramethyl ester disulfate salt of EDTA is dissolved in 50 milliliters of refluxing methanol. 3 grams (10.3 millimoles) of EDTA is added to this solution in 0.5 to 1 gram quantities over the period of 2 to 3 hours. After cooling the solution approximately 20°, 2 grams (40 millimoles) of 99% hydrazine hydrate is added and the solution refluxed 6 to 8 hours.

The volatile components are removed in vacuo leaving 3.8 grams of a yellow oil. The oil has the characteristic behavior of hydrazides of EDTA.

The reaction illustrates possible variations in the composition. The acid ester salt is refluxed in methanol and then additional amino acid is added to provide the desired active intermediate. The nucleophile is then added and after several hours reflux gives the desired product.

EXAMPLE V

From amino acid esters with hydrazine 3.65 grams (0.05 mole) of nitrilotriacetic acid are suspended in 140 grams of methanol and 18.0 grams (0.2 mole) of concentrated sulfuric acid are added with stirring. After refluxing the mixture for 3 to 4 hours, 50% of the methanol is removed. Cooling yields crystals of the trimethyl ester disulfate salt of nitrilotriacetic acid.

The ester disulfate is neutralized with sodium bicarbonate in an ice bath and then extracted with ether. The ether is dried with anhydrous magnesium carbonate and removed in vacuo leaving the pure trimethyl ester of NTA.

1.15 grams (0.01 mole) of the ester and 0.96 gram (1.88 millimoles) of 99% hydrazine hydrate are refluxed in 20 milliliters of ethanol for 3 to 4 hours. Crystals of the dihydrazide of nitrilotriacetic acid form after cooling and standing for several hours.

EXAMPLE VI

From the HEDTA with hydrazine 13.9 grams (0.05 mole) of hydroxyethyl ethylenediamine triacetic acid in 17 grams (0.175 mole) of concentrated sulfuric acid are refluxed in 200 milliliters of methanol. Over a period of 4 to 5 hours, while the solution is being stirred under reflux, an additional 30 grams (0.11 mole) of hydroxyethyl ethylenediaminetriacetic acid is added. It is best if the addition is made in 3 to 5 gram increments. After the final addition of hydroxyethylethylenediaminetriacetic acid the solution is refluxed an additional hour. This activated composition is used as such.

The solution is cooled approximately 20° and 12 grams (0.24 mole) of 99% hydrazine hydrate is added. The solution is refluxed for 5 to 6 hours. Methanol and water are removed in vacuo leaving a residue of yellow oil. Visible spectra of the iron (III) complex of the oil are characteristic of the dihydrazide of hydroxyethylethylenediaminetriacetic acid.

The hydrazine to hydroxyethylethylenediaminetriacetic acid ratio can be increased to produce higher hydrazides. These hydrazides generally contain between 2 and 3 hydrazine moieties per hydroxyethylethylenediaminetriacetic acid molecule.

The addition of hydroxyethylethylenediaminetriacetic acid in small increments to refluxing solutions containing hydroxyethylethylenediaminetriacetic acid and sulfuric acid in the approximate molar ratio of 2:1 to 5:1 in methanol activates the hydroxyethylethylenediaminetriacetic acid molecule as is the case with other amino acids.

EXAMPLE VII.—USING A SUBSTITUTED HYDRAZIDE

Ethylenediaminetetraacetic (N,N-dimethyl) hydrazide

A solution of 50 grams (0.143 mole) of the free base of the tetramethyl ester of EDTA was dissolved in 200 milliters of methanol and 43 grams (0.715 mole or 1.25 times excess) of N,N-dimethylhydrazine was added. The reaction mixture was refluxed for four hours and the solvent was then evaporated under reduced pressure. The thick viscous oil thus obtained was induced to crystallize by storage below 0° C. The low melting crystals thus obtained were filtered and rinsed well with ether and hexane. The yield was 46 grams (70% of the theoretical amount). Purification of the product was accomplished by recrystallization from an ether-hexane mixture to give a product melting between 30 and 31 degrees.

This is the tetradimehtylhydrazide of EDTA as an example. The di-EDTA, di-methylhydrazide may be formed using EDTA anhydride, or the di-ethyl ester dicarboxy methyl of EDTA or the activated ester-anhydride composition described herein. The resulting products are the EDTA bis-di methyl hydrazide, and bis-di methyl hydrazinium salt. This latter may be removed by means of base exchange resin.

EXAMPLE VIII

From CDTA (cyclohexane diaminetetraacetic acid) tetramethyl ester disulfate salt with hydrazine 1.9 grams (3.7 millimoles) of the tetramethyl ester disulfate salt of EDTA is dissolved in 50 milliliters of refluxing methanol. 3.5 grams (10 millimoles) of CDTA is added to this solution in 0.5 to 1 gram quantities over the period of 2 to 3 hours. After cooling the solution approximately 20°, 2 grams (40 millimoles) of 99% hydrazine hydrate is added and the solution refluxed 6 to 8 hours.

The volatile components are removed in vacuo leaving a yellow oil. The oil has the characteristic behavior of hydrazides of CDTA.

The reaction illustrates possible variations in the composition. The acid ester salt is refluxed in methanol and then additional amino acid is added to provide the desired active intermediate. The nucleophile is then added and after several hours reflux gives the desired product.

In all cases, the hydrazine to amino acid ratio can be increased or decreased to produce higher or lower hydrazides respectively.

The addition of amino acids in small increments to refluxing solutions containing the amino acid and sulfuric acid in the approximate molar ratio of 2:1 to 5:1 in methanol activates the amino acid molecule. The activation mechanism probably consist of partial anhydride or acid-ester formation, see reaction below:

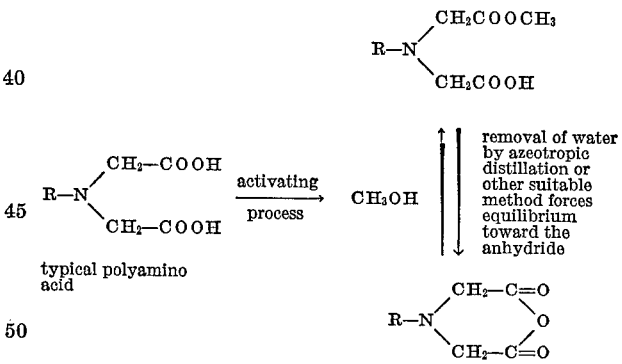

Nonetheless, hydrazine or other nucleophiles react readily with these solutions.

Direct production of partial esters, a possible procedure to produce the partial ester of amino or polyaminopolycarboxylic acids, is to take advantage of the well-known fact that the carboxy methyl(acetic acid) groups are of different acid strength. EDTA is again the example. Two of these groups react strongly when titrated, two are quite weak. It is also of interest that the groups react symmetrically. To accomplish this partial ester production one may proceed as follows:

(A) To 70 milliliters of ethyl or methyl alcohol is added 10 grams of sulfuric acid. Cool and then add 10 grams of EDTA. Agitate at room temperature for a period of time, 1 to 3 hours. The at first quite well dispersed EDTA crystals change to a more fluffy solid finally taking up most of the alcohol. Filter and neutralize with sodium bicarbonate. Water may be added. The ester is only slightly soluble in water. The sulfuric acid may be increased to 15 grams and the time shortened.

(B) The recipe above reported may be heated with good agitation to just clear—stop and cool in cold water. To the still clear solution, water is added to form a 25% alcohol-75% water solution. Then neutralize the acid using sodium bicarbonate. Filter off the almost insoluble partial ester.

(C) Strongly acidic material other than sulfuric acid may be used such as HCl or resins such as, for example, Dow X–50 WX–4. The recipes using resins are usually heated for a time of about 1 to 2 hours, filter and purify as reported.

Dow X–50 WX–4 activated to the proton form is used. 11.5 grams of EDTA (0.04 mole), 26 grams of resin and 150 milliliters of ethanol were refluxed in a distillation flask equipped with means for mechanical agitation. After a period of time the EDTA was found to be in solution in the ester form. The ester liquid was then decanted from the resin and, at room temperature, 8 milliliters (0.16 mole) of hydrazine hydrate 99% were added thereto. The mixture was then refluxed for a period of time whereupon it was flash evaporated to remove the solvents. The resinous clear oil residue weighed 10.5 grams. A test using $Fe^{+3}$ nitrate revealed the product to be the tetrahydrazide of EDTA. Upon using one-half of the hydrazine hydrate concentration (0.08 mole), the dihydrazide was formed. In this process the hydrazides are produced without impurities, e.g. acidic residues, and all volatile reactants may thereafter be recovered.

This process is applicable to amino and polyamino carboxylic acids to form esters which may be subsequently reacted to form polynitrogen derivatives coming within the scope of this disclosure. This simple and unexpected partial esterification suggests the use of a diaphragm to react the solid amino acids to form the ethanol soluble ester zwitterion. It should also be realized by practitioners in the art that the process may be conducted on a continuous basis.

It is noted that the hydroxyethyl triacetic acids are included in the series of aminocarboxymethyl compounds reacted to form the highly reactive partial anhydride-ester composition. It should be pointed out that this type of amino-carboxymethyl compound is quite distinctive, forming lactams with the adjacent carboxy methyl group, for example:

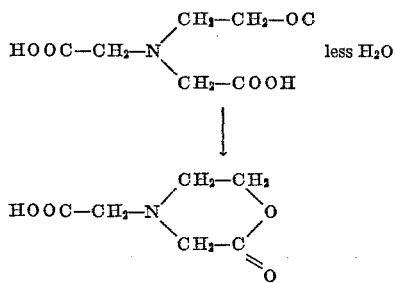

or its polyamino analogs such as hydroxyethylethylenediamine-tri-acetic acid, bis-hydroxyethylethylenediaminediacetic acid and others in which 1 or more carboxymethyl groups are replaced by —$CH_2$—$CH_2$—OH groups. Chelate chemistry teaches that such groups increase stability of the transition metal complex ($Fe^{3+}$) for example, by at least 1 pH unit. This lactam formation is greatly enhanced when the reaction product described herein is employed. When such lactams are reacted with a nucleophilic compound, for example, hydrazine, the hydroxyl ethyl, propyl or isopropyl groups appear to be reformed and only the activated carboxy methyl anhydride-ester forms the hydrazides, as per example:

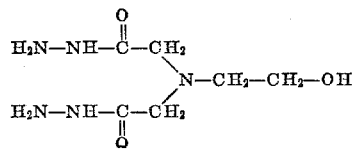

This is important, particularly when the amino acid is a derivative of a polyamine with 1 or more alcohol groups.

Consider HEDTA, a lactam-anhydride of the type

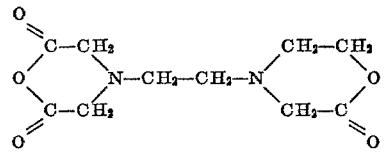

is formed. This lactam-anhydride can be converted to a symmetrical dihydrized by the addition of two moles of hydrazine.

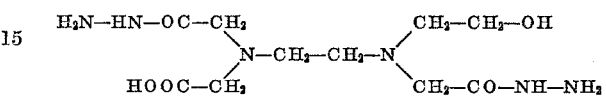

If HBED is employed, the phenolic hyldroxyl groups again present a situation capable of lactam formation, this type of amino acid can be reacted in water as a solvent to form highly effective ligands for iron$^{3+}$ and cobalt II+III.

One may proceed as follows:

(I) 30 grams of HEDTA=0.1 mole commercial grade 30 milliliters water.—Heat to reflux for 1 to 2 hours than add 0.2+10% mole of hydrazine in form of monohydrate—reflux for a period of from 1 to 2 hours, distill off water and some hydrazine—32 milliliters of water are so distilled off. The hydrazide is obtained in form of clear semi-solid gel.

(II) Recipe as above but 18 milliliters of water is distilled off before hydrazine hydrate is added. The residue in the distillation flask is a heavy water clear gel. It does not crystallize on standing at room temperature overnight. To this concentrated gel then is added hydrazine hydrate, reflux for 1 to 2 hours. The product is a honey like resin. This resin of A+B may be dehydrated further using benzene as an azeotrope leaving a quite heavy glass clear resin, taffy-like. The iron, cobalt chelates of all above hydrazide products are extremely stable at pH and prolonged heating a high pH. The hydroxyl derivatives of this invention may be reacted with di-isocyanates to form polymeric products cited in U.S. Pat. 2,956,986. The new polyurethanes thus formed are now polymeric ligands.

The dihydrazide of HBED is easily prepared by the methods described previously.

Although hydrazine has been used exclusively throughout this patent application, other nucleophiles, including substituted hydrazines, e.g. N,N dimethyl hydrazine, phenyl hydrazine etc., react readily with the activated acid esters. The substituted hydrazines produce substituted hydrazides by reactions analogous to those with hydrazine itself. The nucleophiles ethylenediamine, urea and ethanolamine when reacted in a 2:1 molar ratio (nucleophile to EDTA) with the activated acid-ester of EDTA produce the following disubstituted polyfunctional amides.

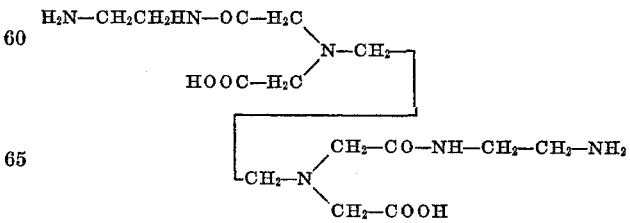

In addition to hydrazine compounds, other nucleophiles having $NH_2$ or NH groups can be used to advantage in the novel process of this invention. Among such nucleophiles are included glycine, sarcosines and partially carboxymethylated amino and polyamino compounds such as diglycine, ethylenediaminediacetic acid, and the like.

Furthermore, the aliphatic nucleophilic reactants may be replaced by aromatic-aliphatic and heterocyclic reactants such as

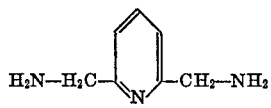

Schiff's bases with the hydrazides.—Some of the diketones which I will attempt to react with the hydrazides to form Schiff's Bases are α-diketones

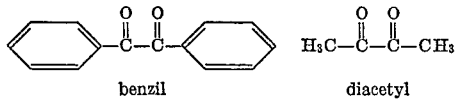

β-diketone

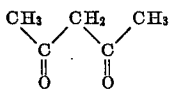

A general type reaction might be written

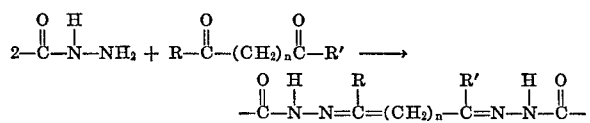

where $n$ may vary from 0 (α-diketones) to some very large number.

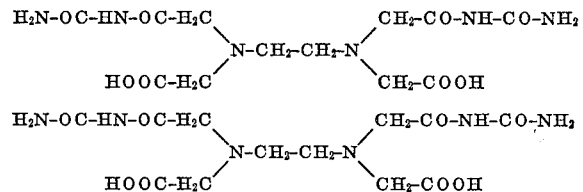

When substituted hydrazides are formed it has been found that the residual amino group can be activated and made to react with electrophilic compounds.

For example, if an inductive group such as ethyl, propyl, etc., is substituted for the amide proton

the terminal amino group becomes more basic, that is, the nitrogen becomes a better electron donor. Thus, the terminal amine group of a substituted (inductive substituent) hydrazide is a more effective metal complexing group and is also a more active nucleophile.

Furthermore, the ligands may react with 2,4-butanediol to form a waxy, water soluble solid which is an excellent sequestrant for iron (III) and which exhibits good viscosity and surface active properties.

The following reactions occur with hydrazides or substituted hydrazides.

Reaction with an organic chloride; ethylene dichloride: 30 grams of ethylenediaminetetraacetic acid hydrazide reaction product containing approximately 20 grams of ethylene diaminetetraacetic acid hydrazide and 50 milliliters of methanol is refluxed with 15 milliliters of ethylene dichloride for a period of 10 hours. It becomes a clear yellowish solution. Methanol and unreacted ethylene dichloride are distilled off. 8 milliliters only of ethylene dichloride is recovered. The concentrated reaction product is a resin, quite stringy, resembling taffy. When a portion of this resin is put in to cold water, a hydrated, quite voluminous, ball of gel is obtained. When heated, the gel goes in solution. A test, using Fe(NO$_3$)$_3$ forms a complex, deep-red at ambient pH, and maroon at high alkaline pH. The chelate is extremely stable to heat and base. It will not decolorize at pH of 13+ as do the polyhydrazides.

A comparable reaction may be conducted with

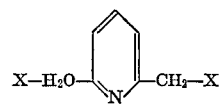

wherein X is chlorine or bromine.

Reaction of the hydrazides with polymeric chloride; poly(chloro)styrene: The hydrazides may be grafted to this chloro polymer. The polymer is slurried in methanol, or ethanol in the presence of a hydrazide. The slurry is refluxed for a period of time. The time may be from 2 to 24 hours, and this will determine the number of chlorides reacted. For example, the 12 hour reaction product shows fair solubility in water. When iron (III) ions are added, the complex forms a viscous solution retaining its water solubility regardless of pH conditions. The product is a "random" polystyrene amino carboxy methyl hydrazide styrene.

The hydrazides are reactive with polyacrylamides in water. NH$_3$ comes off and viscosity of the polyacrylamide is lowered considerably.

Reaction of the hydrazides with acid chlorides:

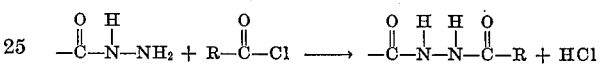

R groups which can be used with the acid chlorides include (1) methyl, CH$_3$;
(2) ethyl, C$_2$H$_5$;
(3) propyl, C$_3$H$_7$;
(4) isopropyl, (CH$_3$)$_2$HC;
(5) n-lauryl, CH$_3$(CH$_2$)$_{10}$;
(6) n-stearyl, CH$_3$(CH$_2$)$_{16}$; plus polyfunctional acid chlorides;
(7) oxalyl chloride, Cl—CO—CO—Cl;
(8) malonyl chloride, Cl—CO—CH$_2$—CO—Cl.

Reaction of the hydrazides with anhydrides:

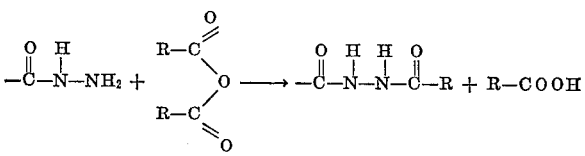

Various acid anhydrides can be used including acetic anhydride, propionic anhydride, n-butyric anhydride, isobutyric anhydride, n-valeric anhydride, (C$_5$H$_9$CO)$_2$O and n-caprioic anhydride, (C$_5$H$_{11}$CO)$_2$O. Polymeric anhydrides of the Gantrez-AN series of G.A.F. resins (General Aniline and Film) can also be used. These materials are capable of forming a polymeric material possessing high affinity for iron (III). Other applicable anhydrides are succinic anhydride and substituted succinic anhydrides such as reported in Bulletin I 8 BR of Allied Chemical Company.

Reaction of the hydrazides with aldehydes and ketones:

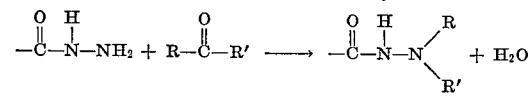

In the above reaction if an aldehyde is used, either R or R' is hydrogen. The products of such a condensation may be useful to change the character of the chelating ligand. For example, if salicylaldehyde is employed, the phenoxyl complexing moiety is added to already strong hydrazide chelating ligand.

Reaction of the hydrazides with ethyleneimine and ethylene oxide:

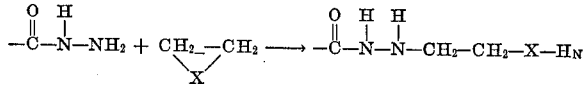

In the above reaction X can be either nitrogen or oxygen. The reaction of the hydrazides with these reactive cyclic compounds produces an increased chain length of the hydrazide when one mole of the cyclic compounds is added per mole of hydrazide moiety present, however, polymeric materials are often formed if the mole ratio is increased.

The synthesis of the hydrazides by the activated acid-ester process may be varied somewhat to produce what are believed to be polymeric products. An example of such a synthesis follows.

28 grams of EDTA and 34 grams of $H_2SO_4$ in 300 cc. of methanol, reflux for 1½ hours then gradually add 72 grams of EDTA in small amounts. Reflux for 3 hours. Cool and add 35 cc. of hydrazine hydrate. Reflux for 4 hours then distill off any volatile methanol—mainly methanol and water. Now if the inner temperature is permitted to rise to 115 to 120° C. a polymeric resinous compound is formed—soluble in water. This material will air dry to a final brittle solid. The resulting chelate of $Fe^{3+}$ is excellent, resembling the chelate of the tetra hydrazide although it cannot be the compound since only 2 mole equivalent of $N_2H_4$ is added per EDTA. There is no $NH_3$ available nor any odor of any type. It may be that the hydrazide group at this temperature, reacts with the residual $CH_2-COO^-$ groups to form a compound, postulated as follows:

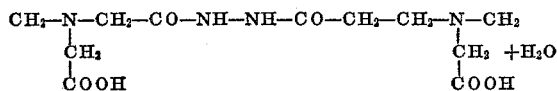

or similar random structures of this type.

The hydrazides can also be made to react with allyl halides and vinyl compounds to form copolymers again containing the hydrazide moiety and possessing excellent complexing properties for transition metal ions.

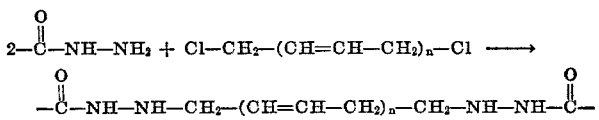

Some properties of the iron chelates of the ligands: This invention deals with the preparation of hydrazides of polyamino-polycarboxylic acids by the formation of an activated intermediate which is believed to contain some form of acid anhydride (or lactam in the case of the hydroxy derivatives). In the process the carboxylate groups are converted to hydrazide groups by the addition of hydrazine under conditions previously described. The carboxylate groups converted per molecule of polyamino-polycarboxylic acid range from one to nearly complete conversion depending upon the amount of hydrazine added. By preference, the reaction products usually contain both hydrazide and carboxylate groups. The presence of both groups produces a ligand with more versatility than those containing either all carboxylate or all hydrazide groupings. A probable structure of the iron (III) EDTA-dihydrazide is shown below

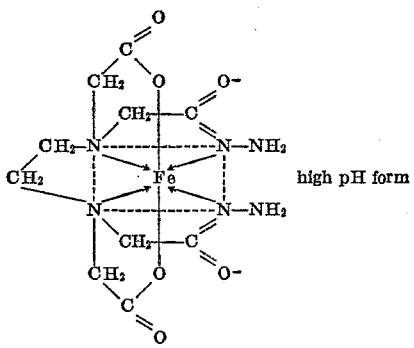

high pH form

The invention also concerns itself with the preparation of polymeric species containing the hydrazide moiety. The chelates of many of the polymeric species are quite useful in the soil and may provide a relatively unique means of proving nutrient in soils ranging from newly seeded plots to desert like. The polymeric chelates have the desirable properties of absorbing water to form more or less dispersed gels, therefore, they are not washed out of the soil and are available to root systems for longer periods of time than normal chelates.

What is perhaps most important concerning all the hydrazide chelates of iron, is that they do not burn the leaves of citrus trees when applied in a spray of high concentration, such as, from 4 to 15 grams of iron per gallon. The same iron chelates will not burn or curl turf of lawns or even the quite sensitive "greens" of golf courses when applied in either solution or solid form.

It should be further noted that the hydrazide chelates of iron may be added to or combined with other nutrient solutions, e.g. zinc chelates, without interfering with the performance of the other nutrient or affecting its integrity. The hydrazides may also be added, in desirable concentration, to iron complexes of ligand sulfonates which are extensively utilized in foliage application. Such an addition is extremely beneficial inasmuch as it aids in complexing the iron more uniformly and, correspondingly, aids in a more uniform distribution of the ligand sulfonate film on the foliage.

SUMMARY OF PROCEDURES

It should be noted that this reaction is a unique way of approaching the synthesis of the compounds for the following reasons:

(1) That the amino acetic acid, especially the ethylenediaminetetraacetic acid, is soluble to a considerable extent in the tetramethyl or -ethyl ester sulfate.

(2) No further amounts of $H_2SO_4$ are added to obtain this valuable reaction intermediate.

(3) The chelates obtained using products of this reaction product are far superior to products obtained by fusion of the respective amino acetic acids.

While it is believed that the product is a partial anhydride, and, as such, is more reactive than the simple ester, it is understood by anyone skilled in the art, that azeotropic distillation may be used to remove water of reaction. It is also understood that other dehydrating methods may be used, for example, acetic anhydride. Both methods will increase anhydride formation.

What is claimed is:

1. The method of forming hydrazide condensation products of aminocarboxylic acids corresponding to the formula

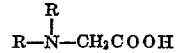

wherein R is selected from the group —$CH_2COOH$, —$CH_2CH_2OH$, or polyamino acids which are defined as follows:

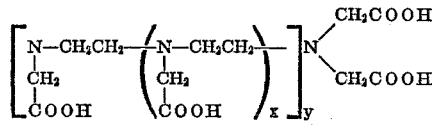

wherein
 $x$ is 0, 1, or 2, and
 $y$ is 0, 1, or 2,
and as many as one —$CH_2COOH$ group per nitrogen may be replaced by —$CH_2CH_2OH$, which comprises substantially fully esterifying the carboxylic acid with an alcohol having a boiling point below about 100° C. incorporating into the esterification mixture a surplus of acid, thereafter, incorporating into the acid esterified mixture additional free polyaminopolycarboxylic acid in amount from at least 1 mole per mole of starting polyaminopolycarboxylic acid, to the point of saturation of the mixture and, thereafter, reacting the ester-acid mixture with hydrazine in amounts up to one mole of hydrazine per —$CH_2COOH$ group of the said polyaminopolycarboxylic acid and conducting said reaction under conditions which will induce removal of water and alcohol of condensation from the reaction mixture.

2. The method in accordance with claim 1 in which the polyaminopolycarboxylic acid is selected from the group consisting of nitrilo acetic acid, ethylenediaminetetraacetic acid, diethylenetriaminepentaacetic acid, and hydroxyethyl variants thereof wherein 1 or 2 —$CH_2COOH$ groups are replaced by —$CH_2CH_2OH$ groups, and in which the esterification of the acid is done with an alcohol selected from the group consisting of methyl, ethyl, propyl and isopropyl.

References Cited
UNITED STATES PATENTS
2,680,131   6/1954   Gold _____ 260—561 H FOREIGN PATENTS
661,411   4/1963   Canada _____ 260—561 H

OTHER REFERENCES

H. Röhnert: Archiv der Pharmazie, vol. 296, pp. 257–61, 1963.

LORRAINE A. WEINBERGER, Primary Examiner

P. J. KILLOS, Assistant Examiner

U.S. Cl. X.R.

260—78 A, 244 R, 439 R, 468 J, 534 E, 561 H